United States Patent
Koo et al.

(10) Patent No.: US 8,838,164 B2
(45) Date of Patent: Sep. 16, 2014

(54) METHOD FOR TRANSMITTING FEEDBACK INFORMATION IN COMP, TERMINAL FOR PERFORMING SAME, METHOD FOR GENERATING CHANNEL STATE INFORMATION AND BASE STATION APPARATUS FOR PERFORMING SAME

(75) Inventors: Ja Ho Koo, Anyang-si (KR); Jae Hoon Chung, Anyang-si (KR); Bin Chul Ihm, Anyang-si (KR); Moon Il Lee, Anyang-si (JP)

(73) Assignee: LG Electronics Inc., Seoul (KR)

(*) Notice: Subject to any disclaimer, the term of this patent is extended or adjusted under 35 U.S.C. 154(b) by 298 days.

(21) Appl. No.: 13/502,351

(22) PCT Filed: Oct. 11, 2010

(86) PCT No.: PCT/KR2010/006926
§ 371 (c)(1),
(2), (4) Date: Apr. 16, 2012

(87) PCT Pub. No.: WO2011/046326
PCT Pub. Date: Apr. 21, 2011

(65) Prior Publication Data
US 2012/0202541 A1      Aug. 9, 2012

Related U.S. Application Data

(60) Provisional application No. 61/252,176, filed on Oct. 16, 2009.

(30) Foreign Application Priority Data

Feb. 5, 2010    (KR) .................... 10-2010-0010833

(51) Int. Cl.
*H04B 7/00*     (2006.01)
*H04L 1/20*     (2006.01)
*H04L 5/00*     (2006.01)
*H04J 11/00*    (2006.01)
*H04W 72/08*    (2009.01)

(52) U.S. Cl.
CPC ............. *H04L 1/20* (2013.01); *H04L 5/0044* (2013.01); *H04J 11/0053* (2013.01); *H04L 5/0062* (2013.01); *H04W 72/082* (2013.01); *H04L 5/0048* (2013.01)
USPC ............. 455/522; 455/69; 455/70; 455/501; 455/569.1; 455/566

(58) Field of Classification Search
USPC .............. 455/522, 69–70, 501, 509, 566
See application file for complete search history.

(56) References Cited

U.S. PATENT DOCUMENTS 8,437,789 B2 * 5/2013 Kim et al. .................. 455/509

(Continued)

OTHER PUBLICATIONS

LG Electronics, "Feedback information for downlink coordinated scheduling/beamforming", 3GPP TSG RAN WG1 #57bis, R1-092491, Jun. 29 -Jul. 3, 2009.
Alcatel-Lucent, "Comparison of CSI Feedback Schemes", 3GPP TSG RAN WG1 #57bis, R1-092310, Jun. 29-Jul. 3, 2009.

(Continued)

*Primary Examiner* — Fayyaz Alam
(74) *Attorney, Agent, or Firm* — Mckenna Long & Aldridge LLP (57) ABSTRACT

Disclosed are a method for estimating a channel state in a CoMP operation of a terminal and a method for generating channel state information of a base station. A terminal can measure strength or an interference level of a signal of each cell using a reference signal received from each cell for performing the CoMP operation. In addition, the terminal can measure the sum of the interference levels of the cells which do not perform the CoMP operation using a region from which a reference signal of a serving cell of each cell is transmitted. In addition, the terminal can transmit to the serving base station the strength of the interference level of the signal of each cell for performing the measured CoMP operation and the sum of the interference levels of the cells which do not perform the CoMP operation.

11 Claims, 6 Drawing Sheets

(56) References Cited

U.S. PATENT DOCUMENTS

| | | |
|---|---|---|
| 2010/0317355 A1* | 12/2010 | Zangi et al. ............... 455/450 |
| 2011/0098072 A1* | 4/2011 | Kim et al. ............... 455/509 |
| 2012/0188904 A1* | 7/2012 | Koo et al. ............... 370/252 |
| 2012/0202541 A1* | 8/2012 | Koo et al. ............... 455/501 |

OTHER PUBLICATIONS

Etri, "UE feedback for downlink CoMP", 3GPP TSG RAN WG1 #57bis, R1-092304, Jun. 29-Jul. 3, 2009.

Etri, "Multi-cell PMI coordination for downlink CoMP", 3GPP TSG RAN WG1 #57bis, R1-092303, Jun. 29-Jul. 3, 2009.

* cited by examiner

METHOD FOR TRANSMITTING FEEDBACK INFORMATION IN COMP, TERMINAL FOR PERFORMING SAME, METHOD FOR GENERATING CHANNEL STATE INFORMATION AND BASE STATION APPARATUS FOR PERFORMING SAME

This application is a 35 U.S.C. §371 National Stage entry of International Application No. PCT/KR2010/006926, filed Oct. 11, 2010, and claims the benefit of U.S. Provisional Application No. 61/252,176, filed Oct. 16, 2009, and Korean Patent Application No. 10-2010-0010833, filed Feb. 5, 2010, all of which are incorporated by reference in their entirety herein.

TECHNICAL FIELD

The present invention relates to a wireless communication system, and more particularly to a method for transmitting feedback information and a user equipment for performing the same, and a method for generating channel quality information and a base station for performing the same.

BACKGROUND ART

Recently, a multiple input multiple output (MIMO) system has received much attention as a broadband wireless communication technology. The MIMO system means a system that enhances communication efficiency of data by using a plurality of antennas. The MIMO system may be divided into a spatial multiplexing scheme and a spatial diversity scheme depending on transmission of same data.

The spatial multiplexing scheme means a scheme that may transmit data at high rate without even increasing a system bandwidth by simultaneously transmitting different data through a plurality of transmitting antennas. The spatial multiplexing scheme means a scheme that may obtain transmission diversity by transmitting same data from a plurality of transmitting antennas. An example of the spatial diversity scheme includes a space time channel coding scheme.

Also, the MIMO system may be divided into an open loop system and a closed loop system depending on feedback of channel information from a receiving side to a transmitting side. An example of the open loop system includes a space-time trellis code (STTC) system in which a transmitting side transmits information in parallel while a receiving side detects a signal by repeatedly using a zero forcing (ZF) scheme and a minimum mean square error (MMSE) scheme and obtains transmission diversity and encoding gain by using a blast and spatial area that can increase information as much as the number of transmitting antennas. An example of the closed loop system includes a transmit antenna array (TxAA) system.

A coordinated multi-point system (hereinafter, referred to as 'CoMP system') is the system for improving throughput of a user located at the cell edge by applying improved MIMO transmission under the multi-cell environment. If the CoMP system is applied, inter-cell interference may be reduced under the multi-cell environment. In case of the CoMP system, a user equipment may commonly be supported with data from multi-cell base stations.

Also, each base station may improve system throughput by supporting the same radio frequency resource to one or more user equipments UE1, UE 2, ..., UE K at the same time. Also, the base station may perform a space division multiple access (SDMA) method based on channel state information (CSI) between the base station and the user equipment.

The CoMP system may be divided into a coordinated MIMO (Co-MIMO) type joint processing (JP) scheme through data sharing and a coordinated scheduling scheme/beamforming (CS/CB) scheme.

Figure 1:
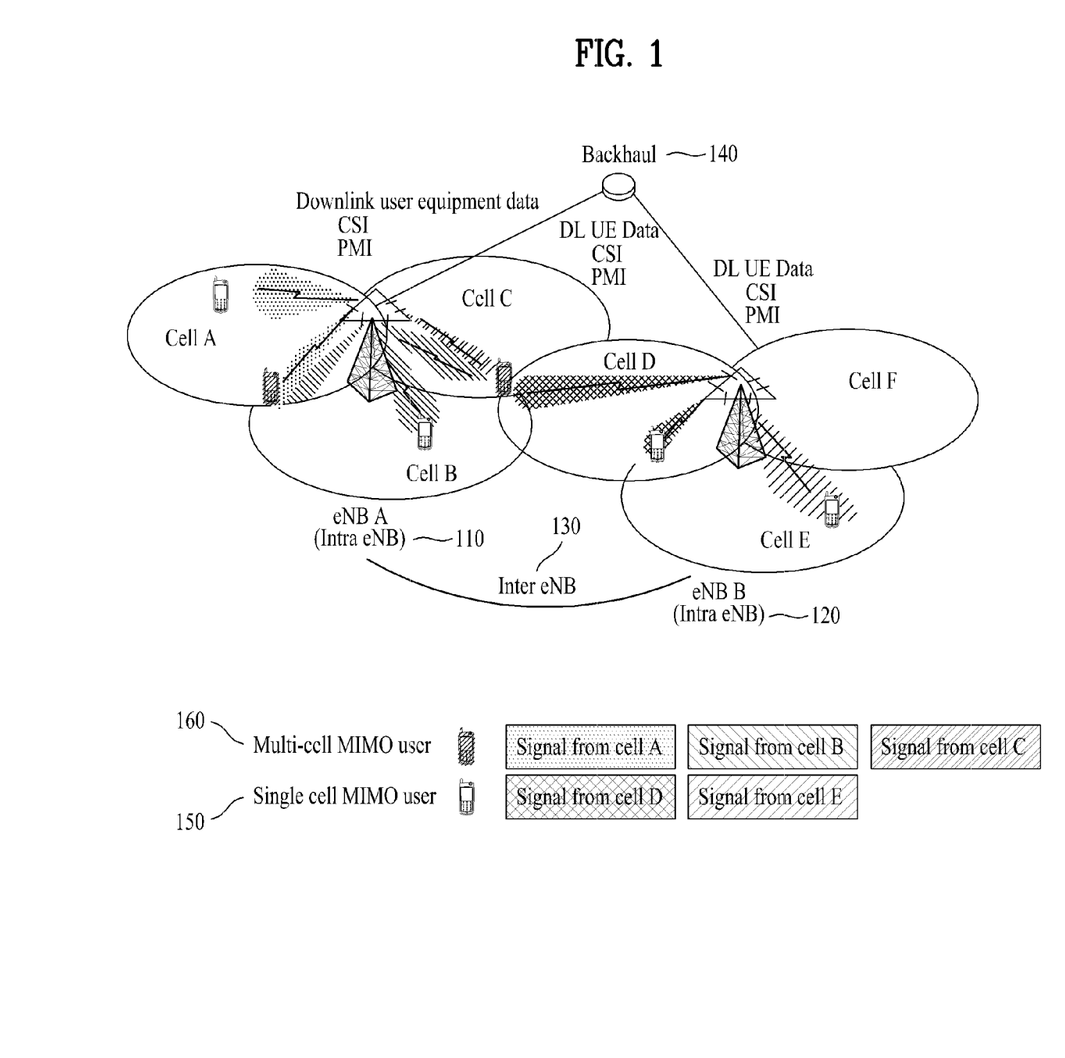
FIG. 1 is a conceptional diagram illustrating CoMP operations of intra eNBs and an inter eNB according to the related art.

FIG. 1 is a conceptional diagram illustrating CoMP operations of intra base stations (eNBs) and an inter base station (eNB) according to the related art.

Referring to FIG. 1, intra base stations 110, 120 and an inter base station 130 exist under a multi cell environment. According to a long term evolution (LTE) system, the intra base stations include several cells (or sectors). Cells that belong to a base station to which a specific user equipment belongs are in the relation of intra base stations 110, 120 with the specific user equipment. Namely, cells that share the same base station as that of a cell to which a user equipment belongs are those corresponding to the intra base stations 110 and 120 while cells that belong to other base stations are those corresponding to the inter base station 130. In this way, although cells based on the same base station as that of the specific user equipment transmit and receive information (for example, data and channel state information (CSI)) through x2 interface, cells based on a base station different from that of the specific user equipment may transmit and receive information through a backhaul 140.

As illustrated in FIG. 1, a single cell MIMO user 150 located within a single cell may perform communication with a single serving base station in one cell (sector), and a multi-cell MIMO user 160 located at the cell edge may perform communication with a plurality of serving base stations in multiple cells (sectors).

However, since each cell generates a reference signal sequence based on each cell ID (identifier), the user equipment cannot estimate this value desirably in case of a multi-cell based CoMP operation. In this respect, a new method for solving this problem will be required.

DISCLOSURE

Technical Problem

Accordingly, an object of the present invention devised to solve the conventional problem is to provide a method for transmitting feedback information in a CoMP operation.

Another object of the present invention is to provide a method for generating channel quality information in a CoMP operation.

Still another object of the present invention is to provide a user equipment for transmitting feedback information in a CoMP operation.

Further still another object of the present invention is to provide a base station for generating channel quality information in a CoMP operation.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, according to one embodiment of the present invention, a method for transmitting feedback information at a user equipment (UE) in a CoMP operation comprises the steps of measuring a strength of a signal or an interference level of each cell by using a reference signal received from each cell, which performs the CoMP operation; measuring the sum of noise and the interference levels of the cells which do not perform the CoMP operation by using a region to which a reference signal of a serving cell among each cell is transmitted; and transmitting to a serving base station one or more of the measured signal strength or interference level of each cell, which performs the CoMP operation, and the sum of noise and the interference levels of the cells which do not perform the CoMP operation, or one or more specific values generated using two or more of the measured signal strength or interference level of each cell and the sum of the noise and interference level of the cells which do not perform the CoMP operation. At this time, data of a neighboring cell, which performs the CoMP operation, is mapped into a region except for a region where the reference signal of the serving cell is mapped, and the reference signal of the serving cell and signals of the cells, which do not perform the CoMP operation, are identified as specific tones in the region where the reference signal of the serving cell is mapped.

To solve the aforementioned technical problems, according to another embodiment of the present invention, a user equipment for transmitting feedback information in a CoMP operation comprises a measurement means configured to measure a strength of a signal or an interference level of each cell by using a reference signal received from each cell, which performs the CoMP operation; and a sum of noise and interference levels of cells, which do not perform the CoMP operation, by using a region to which a reference signal of a serving cell among the respective cells is transmitted; and a transmission means configured to transmit to a serving base station one or more of the measured signal strength or interference level of each cell, which performs the CoMP operation, and the sum of the noise and the interference levels of the cells which do not perform the CoMP operation, or one or more specific values generated using two or more of the measured signal strength or interference level of each cell and the sum of the noise and interference level of the cells which do not perform the CoMP operation, wherein data of a neighboring cell, which performs the CoMP operation, is mapped into a region except for a region where the reference signal of the serving cell is mapped, and the reference signal of the serving cell and signals of the cells, which do not perform the CoMP operation, are identified as specific tones in the region where the reference signal of the serving cell is mapped.

To solve the aforementioned technical problems, according to still another embodiment of the present invention, a method for generating channel quality information in a CoMP operation comprises the steps of receiving from a user equipment one or more of a signal strength or interference level of each cell, which performs the CoMP operation, and a sum of noise and interference levels of cells which do not perform the CoMP operation, or one or more specific values generated using two or more of the signal strength or interference level of each cell and the sum of the noise and interference level of the cells which do not perform the CoMP operation; and generating one or more of a channel quality information value corresponding to a first CoMP operation scheme and a channel quality information value corresponding to a second CoMP operation scheme by using the received information, wherein data of a neighboring cell, which performs the CoMP operation, is mapped into a region except for a region where a reference signal of a serving cell is mapped, and the reference signal of the serving cell and signals of the cells, which do not perform the CoMP operation, are identified as specific tones in the region where the reference signal of the serving cell is mapped.

To solve the aforementioned technical problems, according to further still another embodiment of the present invention, a base station for generating channel quality information in a CoMP operation comprises a receiving means configured to receive from a user equipment one or more of a signal strength or interference level of each cell, which performs the CoMP operation, and a sum of noise and interference levels of cells which do not perform the CoMP operation, or one or more specific values generated using two or more of the signal strength or interference level of each cell and the sum of noise and interference level of each cell; and a generating means configured to generate one or more of a channel quality information value corresponding to a first CoMP operation scheme and a channel quality information value corresponding to a second CoMP operation scheme by using the received information, wherein data of a neighboring cell, which performs the CoMP operation, is mapped into a region except for a region where a reference signal of a serving cell is mapped, and the reference signal of the serving cell and signals of the cells, which do not perform the CoMP operation, are identified as specific tones in the region where the reference signal of the serving cell is mapped.

Advantageous Effects

According to the present invention, the user equipment located at the cell edge may receive a desired signal from multiple cells while reducing inter-cell interference, and may effectively measure the signal from the base station.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, although the following description will be made based on a mobile communication system of a 3GPP LTE system, the following description may be applied to other mobile communication systems except for unique features of the 3GPP LTE system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Furthermore, in the following description, it is assumed that a user equipment means a mobile or fixed type user terminal such as a mobile station (MS). It is also assumed that a base station means a random node of a network node, such as Node B and eNode B, which performs communication with a user equipment.

In the mobile communication system, a user equipment may receive information from a base station through a downlink. Also, the user equipment may transmit information through an uplink. Examples of information transmitted from and received by the user equipment include data and various kinds of control information. Various physical channels exist depending on types of information transmitted from or received by the user equipment.

Figure 2:
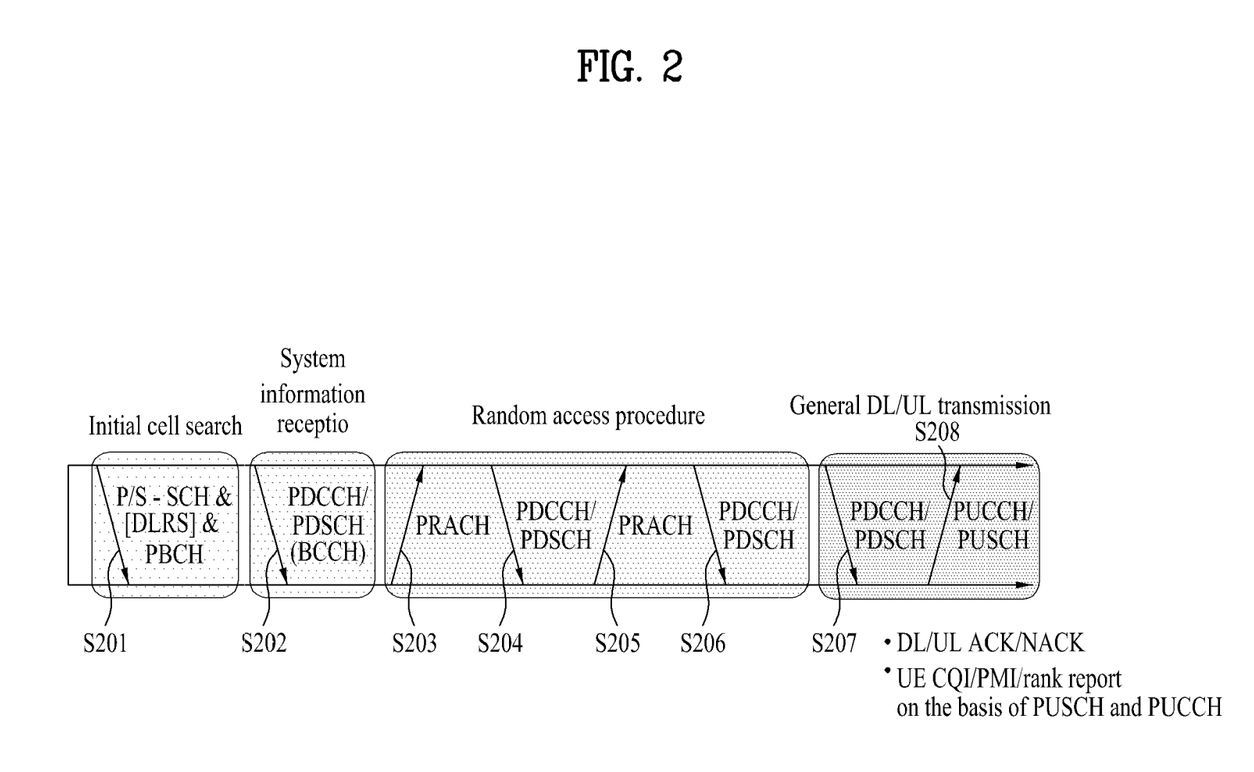
FIG. 2 is a diagram illustrating physical channels used in a $3^{rd}$ generation partnership project long term evolution (3GPP) system, which is an example of a mobile communication system, and a general method for transmitting a signal using the physical channels.

FIG. 2 is a diagram illustrating physical channels used in a $3^{rd}$ generation partnership project long term evolution (3GPP) system, which is an example of a mobile communication system, and a general method for transmitting a signal using the physical channels.

Referring to FIG. 2, the user equipment performs initial cell search such as synchronizing with the base station when it newly enters a cell or the power is turned on (S201). To this end, the user equipment may synchronize with the base station by receiving a primary synchronization channel (P-SCH) and a secondary synchronization channel (S-SCH) from the base station, and may acquire information of cell ID, etc. Afterwards, the user equipment may acquire broadcast information within a cell by receiving a physical broadcast channel from the base station. Meanwhile, the user equipment may identify the channel status of a downlink by receiving a downlink reference signal (DL RS) in the initial cell search step.

The user equipment which has finished the initial cell search may acquire more detailed system information by receiving a physical downlink control channel (PDCCH) and a physical downlink control channel (PDSCH) based on the physical downlink control channel information (S202).

Meanwhile, if the user equipment initially accesses the base station, or if there is no radio resource for signal transmission, the user equipment may perform a random access procedure (RACH) for the base station, such as step S203 to S206. To this end, the user equipment may transmit a preamble of a specific sequence through a random physical random access channel (PRACH) (S203), and may receive a response message to the random access through the PDCCH and the PDSCH corresponding to the PDCCH (S204). In case of contention based random access except for handover, a contention resolution procedure such as transmission (S205) of PRACH and reception (S206) of PDCCH/PDSCH may be performed additionally.

The user equipment which has performed the aforementioned steps may receive the PDCCH/PDSCH (S207) and transmit a physical uplink shared channel (PUSCH) and a physical uplink control channel (PUCCH) (S208), as a general procedure of transmitting uplink/downlink signals. The control information transmitted from the user equipment to the base station or received from the base station to the user equipment through the uplink includes downlink/uplink ACK/NACK signals, channel quality information (CQI), a precoding matrix index (PMI), and a rank indicator (RI).

In the present invention, the terminology, base station may be referred to as a cell or sector if it is used as a geographical concept. The serving base station (or cell) may be regarded as a base station (or cell) that provides a main service to the user equipment, and may perform transmission and reception of control information on a coordinated multiple transmission point. In this respect, the serving base station (or cell) may be referred to as an anchor base station (or anchor cell). The serving base station may transmit various kinds of information, which are received from the user equipment, to a neighboring base station (cell). Likewise, the neighboring base station may be referred to as a neighboring cell if it is used as a geographical concept.

Also, 'a set that performs a CoMP operation' used in the present invention means a set of cells that perform a CoMP operation. A set that performs a CoMP operation includes a serving cell, to which the user equipment belongs, and a neighboring cell that performs a CoMP operation with the serving cell. The reference signal (RS) used in the present invention includes all kinds of reference signals such as a common reference signal (CRS), a dedicated reference signal (DRS), a channel state information-reference signal (CSI-RS), and a demodulation reference signal (DM-RS).

If a CoMP operation system is used under the multi-cell environment, communication throughput of a user equipment at the cell edge may be improved. Examples of the CoMP operation system include a coordinated MIMO type joint processing (JP) scheme, a coordinated scheduling/beamforming (CS/CB) scheme for reducing inter-cell interference. Examples of the coordinated scheduling/beamforming (CS/CB) scheme include a worst companion scheme and a best companion. In this case, according to the worst companion scheme, as the user equipment that performs a CoMP operation reports a PMI having the greatest interference for cells that perform a CoMP operation to the serving base station, the corresponding cells may remove inter-cell interference by using suboptimal PMI except for the PMI having the greatest interference. According to the best companion scheme, as the user equipment that performs a CoMP operation reports a PMI having the smallest interference for cells that perform a CoMP operation to the serving base station, the corresponding cells may reduce inter-cell interference by using the PMI having the smallest interference.

As described above, the communication for the CoMP operation system is suggested to reduce inter-cell interference under the multi-cell environment and improve throughput of the user equipment at the cell edge. To this end, exact channel estimation based on a reference signal (RS) from a multi-base station is required. In particular, in case that the CoMP operation system is performed, to effectively perform the joint processing scheme as well as the coordinated scheduling/beamforming (CS/CB) scheme through feedback transmission of one time, the user equipment should measure signal strength of a serving cell, signal strength of neighboring cells belonging to a set that performs a CoMP operation, and strength of noise and interference caused by cells other than a set that performs a CoMP operation, and should transmit the measured result to the serving base station. Hereinafter, a method for allowing a user equipment to exactly measure signal strength of a serving cell, signal strength of neighboring cells belonging to a set that performs a CoMP operation, and strength of noise and interference caused by cells other than a set that performs a CoMP operation, from multi-cells operated by the CoMP operation scheme and to efficiently perform the CoMP operation under a multi-cell based environment will be suggested.

The cell edge user equipment that performs a CoMP operation needs to transmit feedback information, which is required to effectively perform all the schemes (for example, joint processing (JP) scheme and coordinated scheduling/beamforming (CS/CB) scheme) that perform a CoMP operation, to the serving base station. If the user equipment transmits the feedback information, overhead caused by complicated signaling may be reduced, and the user equipment and each cell, which performs a CoMP operation, may efficiently perform various CoMP operations. To support this, the user equipment may measure values of channel quality information (CQI) between multi-cells and feed the measured values back to the serving base station.

The user equipment, which performs a CoMP operation, may measure a proper CQI value for neighboring cells, which provide interference or a preferred signal, as well as the serving cell, which performs a CoMP operation, and may feed the measured value back to the serving base station. The serving base station may perform all the schemes that perform a CoMP operation, on the basis of the CQI value. To this end, the user equipment needs to measure signal strength of the serving cell, signal strength of neighboring cells belonging to the CoMP set of the user equipment, and strength of noise and interference caused by the cells other than the CoMP set, and to transmit the measured result to the serving base station. If the user equipment may measure the above values and feed the measured values back to the serving base station, the serving base station may exactly calculate the CQI value for the joint processing (JP) scheme as well as the coordinated scheduling/beamforming scheme on the basis of the received feedback information and perform optimized transmission.

Figure 3:
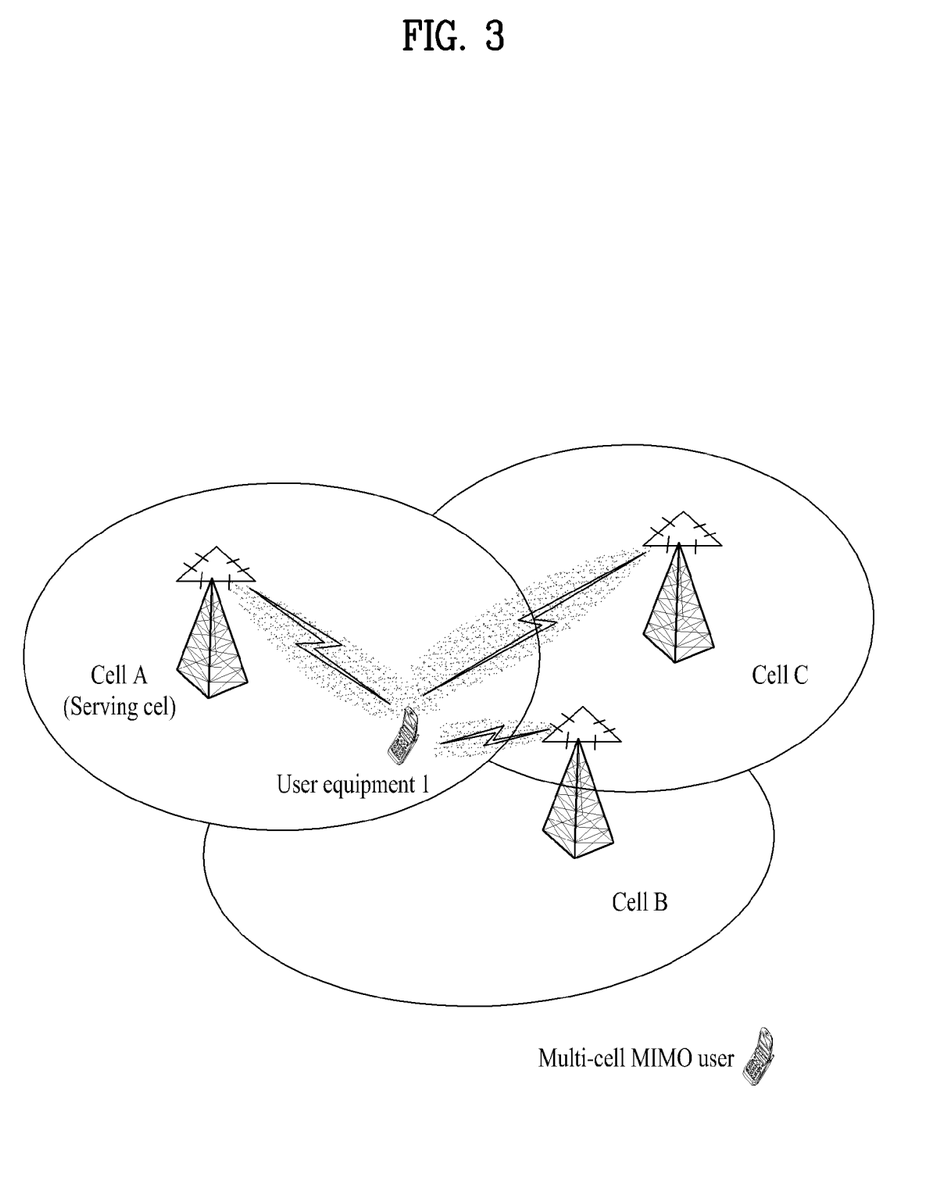
FIG. 3 is a diagram illustrating a CoMP operation performed by a specific CoMP set.

FIG. 3 is a diagram illustrating a CoMP operation performed by a specific CoMP set.

Referring to FIG. 3, a serving cell A 310, a cell B 320, and a cell C 330 perform a CoMP operation with a user equipment 340 belonging to the edge of the cell A. The user equipment 340 may measure signal strength $S_A$ of the serving cell 310, signal strengths $S_B$ and $S_C$ of neighboring cells belonging to a CoMP set, and noise and interference level (or strength) $\overline{N}$ caused by cells (not shown) other than the CoMP set to support all the CoMP operations.

And, the user equipment 340 may transmit the measured values or various combination values that may be expressed using the measured values to the serving base station. For example, the user equipment may transmit one or more of the measured values, $S_A$, $S_B$, $S_C$ and $\overline{N}$ to the serving base station. Alternatively, the user equipment may transmit values, which are generated using two or more of the measured values $S_A$, $S_B$, $S_C$ and $\overline{N}$, for example, values such as $S_B/S_A$ and $S_C/\overline{N}$, to the serving base station.

The serving base station that has received the above various types of values may calculate CQI values for performing the coordinated scheduling/beamforming (CS/CB) scheme and the joint processing (JP) scheme. The following Equations 1 and 2 illustrate examples of CQI values generated by the serving base station in accordance with the beamforming scheme and the joint processing scheme, respectively.

$$CQI_{CB} = \frac{S_A}{\overline{N}} \qquad \text{[Equation 1]}$$

$$CQI_{JP} = \left(\frac{\sqrt{S_A} + \sqrt{S_B} + \sqrt{S_C}}{\sqrt{\overline{N}}}\right)^2 \qquad \text{[Equation 2]}$$

In this case, $S_A$, $S_B$ and $S_C$ are signal strengths (or strengths of interference) measured by the user equipment using reference signals received from the cells A, B and C that perform the CoMP operation, and $\overline{N}$ is strength of noise and interference measured from neighboring cells (cells which do not belong to the CoMP set) which do not perform the CoMP operation. At this time, the cell A is the serving cell.

The above Equation 1 is the CQI value calculated when the coordinated scheduling/beamforming (CS/CB) scheme of the CoMP scheme is performed, and the Equation 2 is the CQI value calculated when the joint processing (JP) scheme of the CoMP scheme is performed. Also, the methods for calculating CQI values, which are expressed by the Equations 1 and 2, are only exemplary, and various CQI values may be expressed using the respective elements $S_A$, $S_B$, $S_C$, and $\overline{N}$.

As will be aware of it from the Equations 1 and 2, the CQI value for the coordinated scheduling/beamforming (CS/CB) scheme or the joint processing (JP) scheme may be obtained from the values $S_A$, $S_B$, $S_C$, and $\overline{N}$ transmitted from the user equipment. This feedback information of the user equipment may support all the CoMP schemes.

The user equipment 340 may measure strength $S_A+S_B+S_C+\overline{N}$ of all the signals received from neighboring cells that do not perform the CoMP operation, in addition to the serving cell A 310, the cell B 320 and the cell C 330. At this time, the user equipment may measure the strength $S_A$ of the serving cell A 310, the strength $S_B$ of the cell B 320, and the strength $S_C$ of the cell C 330 by using the reference signals respectively received from the serving cell A 310, the cell B 320 and the cell C 330. The user equipment 340 may estimate a value of $\overline{N}+S_B+S_C$ by using the value of $S_A$ measured from the serving cell A 310 and the strength $(S_A+S_B+S_C+\overline{N})$ of all the signals. Likewise, the user equipment 340 may respectively estimate $\overline{N}+S_A+S_C$ and $\overline{N}+S_B+S_A$ by using the value of $S_B$ of the cell B 320, the value of $S_C$ of the cell C 330, and the strength $(S_A+S_B+S_C+\overline{N})$ of all the signals.

In order to obtain strength $\overline{N}$ of noise and interference generated by cells (not shown) other than the CoMP set, boosting levels of the reference signals and data of the neighboring cells may be required to be provided equally or uniformly. In this case, various methods for exactly measuring the value of $\overline{N}$ will be described.

If the user equipment 340 knows the boosting levels of the reference signals of the neighboring cells 320 and 330 that perform the CoMP operation, the strength $\overline{N}$ of noise and interference generated by the cells (not shown) other than the CoMP set may be obtained. To this end, the serving base station 310 may notify the user equipment 340 of the boosting levels of the reference signals and data of the neighboring cells 320 and 330 that perform the CoMP operation. If it is previously defined that the boosting levels of the reference signals of the neighboring cells 320 and 330 that perform the CoMP operation are set to be the same as those of data and reference signals of the serving cell, the user equipment 340 may identify the boosting levels of the reference signals of the neighboring cells 320 and 330. Otherwise, if the boosting levels of data and reference signals for performing the CoMP operation are previously set and the cells belonging to the CoMP set transmit data and reference signals in accordance with the boosting levels, the user equipment may identify the boosting levels of the reference signals of the neighboring cells 320 and 330 that perform the CoMP operation.

The serving base station 310 may transmit information on the boosting levels of the reference signals (boosting levels of neighboring cells or boosting levels of CoMP reference signals) to the user equipment 340 through upper layer signaling or L1/L2 control signaling.

The serving base station 310 may transmit reference signal booting information to the user equipment 340 through upper layer signaling. The serving base station 310 may transmit information on the number of antennas and ID of the corresponding cells 320 and 330 that perform the CoMP operation to the user equipment 340 if necessary. The reference signal boosting information may be transmitted to the user equipment 340, which should perform the CoMP operation, at an event-triggering time or periodically.

Generally, the base station may transmit scheduling allocation information and other control information through the PDCCH. The physical control channel may be transmitted to one aggregation or a plurality of continuous control channel elements (CCEs). One CCE includes nine resource element groups. The number of resource element groups which are not allocated to a physical control format indicator channel (PCI-FICH) or a physical hybrid automatic repeat request indicator channel (PHICH) is $N_{REG}$. The CCEs available in the system are from 0 to $N_{CCE}-1$ (in this case, $N_{CCE}=\lfloor N_{REG}/9 \rfloor$). The PDCCH supports multiple formats as expressed in Table 1 below. One PDCCH that includes n continuous CCEs starts from CCE that performs i mod n=0 (in this case, i is a CCE number). The multiple PDCCHs may be transmitted to one subframe.

TABLE 1

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Referring to Table 1, the base station may determine a PDCCH format depending on how many regions control information are transmitted. The user equipment may reduce overhead by reading out control information in a unit of CCE.

The serving base station may notify the user equipment of information such as reference signal boosting level through L1/L2 control signaling. In other words, the serving base station may be designed to identify a PDCCH of a DCI format based on control information. At this time, the DCI format may be configured in such a manner that some field on an arbitrary DCI format are used in view of reuse of the existing DCI format and the other fields are filled with zero padding or arbitrary values.

In order to effectively estimate the strength $\overline{N}$ of noise and interference generated by the cells (not shown) other than the CoMP set, the neighboring cells that perform the CoMP operation may perform nulling for data tone causing collision with the reference signal of the serving cell belonging to the user equipment. In other words, the neighboring cells receive information on a region allocated to the user equipment, from the serving cell, and perform nulling for data tone that may collide with the reference signal of the serving cell in the corresponding region on the basis of the received information. Such nulling for data tone is not performed for the other regions to which the user equipment of the serving cell is not allocated, i.e., where the CoMP operation is not performed. The information on the region allocated to the user equipment or the information on the reference signal of the serving cell may be shared between the base stations (between cells) through a backhaul.

Figure 4:
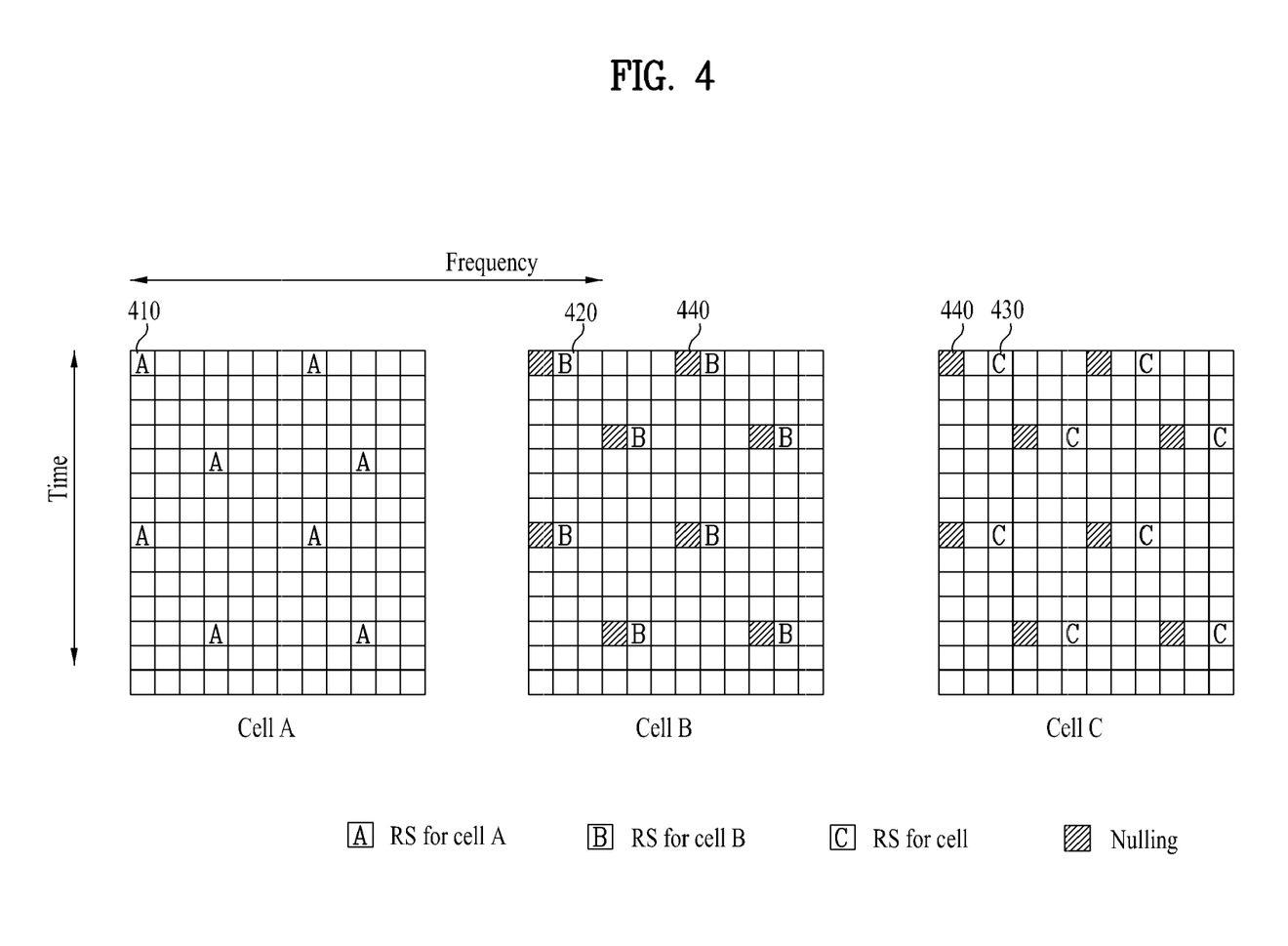
FIG. 4 is a diagram illustrating a mapping example of a signal for transmission from cells, which perform a CoMP operation, to a user equipment into a physical resource region.

FIG. 4 is a diagram illustrating a mapping example of a signal for transmission from cells, which perform a CoMP operation, to a user equipment into a physical resource region.

FIG. 4(a) to FIG. 4(c) illustrate that the cell A 310, the cell B 320 and the cell C 330, which perform the CoMP operation, map a signal to be transmitted from the cell C 330 to the user equipment 340, which belongs to the edge of the cell A, into a physical resource region. In this case, in order to effectively estimate the strength $\overline{N}$ of noise and interference, as shown in FIG. 4 (b) and FIG. 4, nulling may be performed for a data part of the cell B 320 and the cell C 330, where collision with the reference signal position of the cell A 310 occurs. Since slashed resource elements in FIG. 4(b) and FIG. 4(c) collide with the reference signal position of the cell A 310, the part of the cell B 320 and the cell C 330 may be subjected to nulling 440.

Through data nulling as above, the user equipment 340 may estimate the signal strength $S_A$ of the serving cell and the strength $\overline{N}$ of noise and interference generated by the cells (not shown) other than the CoMP set at the reference signal position of the cell A 310. In other words, since the cell B 320 and the cell C 330 do not transmit any signal to a reference signal region 410 of the cell A 310, this region 410 is only affected by the signal of the serving cell 310 and noise and interference of the cells (not shown) other than the CoMP set. The user equipment 340 may easily measure the signal strengths $S_B$ and $S_C$ of the cell B 320 and the cell C 330 through respective reference signals 420 and 430 of the cell B 320 and the cell C 330. Nulling of the neighboring cells 320 and 330 may continuously be performed for the time when the CoMP operation is performed. However, in this case, as the neighboring cells 320 and 330 perform nulling for data tone, data loss may occur. Accordingly, nulling may be performed for the time only when the user equipment 340 performs specific measurement, whereby data loss may be reduced.

Figure 5:
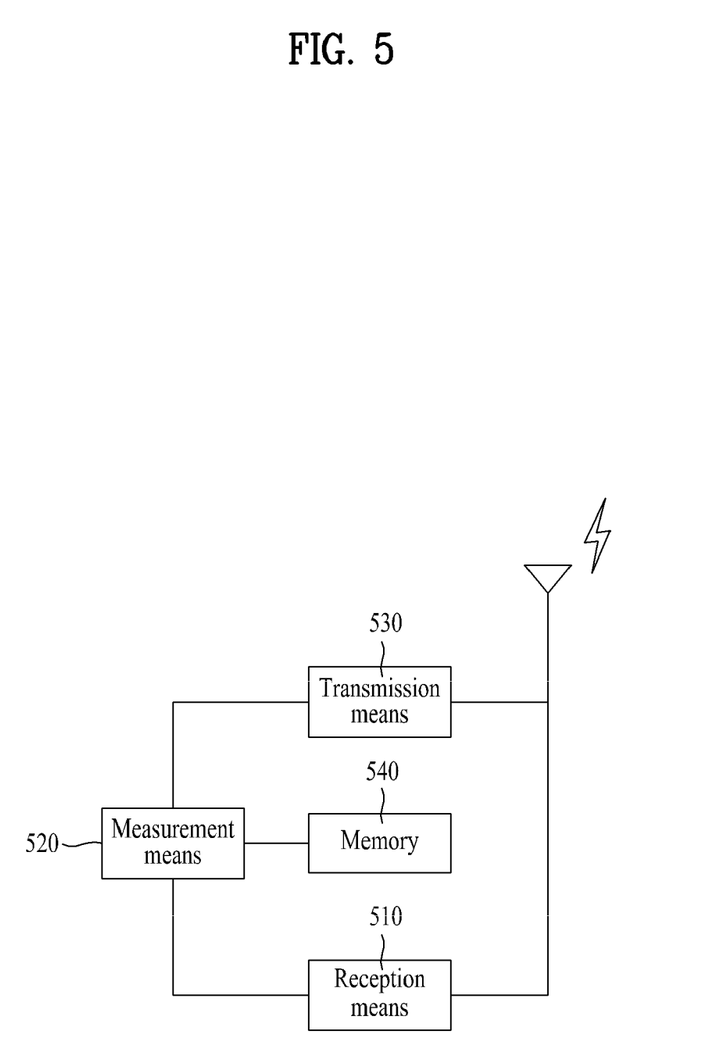
FIG. 5 is a diagram illustrating a preferred embodiment of a user equipment according to the present invention.

FIG. 5 is a diagram illustrating a preferred embodiment of a user equipment according to the present invention.

Referring to FIG. 5, the user equipment may include a reception means 510, a measurement means 520, a transmission means 530, and a memory 540. The reception means 510 may receive signals and various data from the outside such as a serving base station. The reception means 510 may receive reference signal from respective cells that perform a coordinated multi-point (CoMP) operation.

The measurement means 520 may measure signal strength or interference level of each cell by using the reference signal received by the reception means 510. Also, the measurement means 520 may measure the sum of noise and interference levels of the cells, which do not perform a CoMP operation, by using the region to which a reference signal of a serving cell of the above cells is transmitted.

The transmission means 530 may transmit one or more of signal strength or interference level of each cell, which performs the measured CoMP operation, and the sum of noise and interference levels of cells which do not perform the CoMP operation, to the serving base station. Alternatively, the transmission means 530 may transmit one or more specific values, which are generated using two or more of signal strength or interference level of each cell and the sum of noise and interference levels of the cells that do not perform the CoMP operation, to the serving base station.

At this time, the data of the neighboring cells that perform the CoMP operation may be mapped into a region except for the region where the reference signal of the serving cell is mapped, and the reference signal of the serving cell and the signals of the cells, which do not perform the CoMP operation, may be identified as specific tones in the region where the reference signal of the serving cell is mapped.

The memory 540 may store externally received information, operation-processed information, etc. for a predetermined time period, and may be replaced with an element such as a buffer (not shown).

Figure 6:
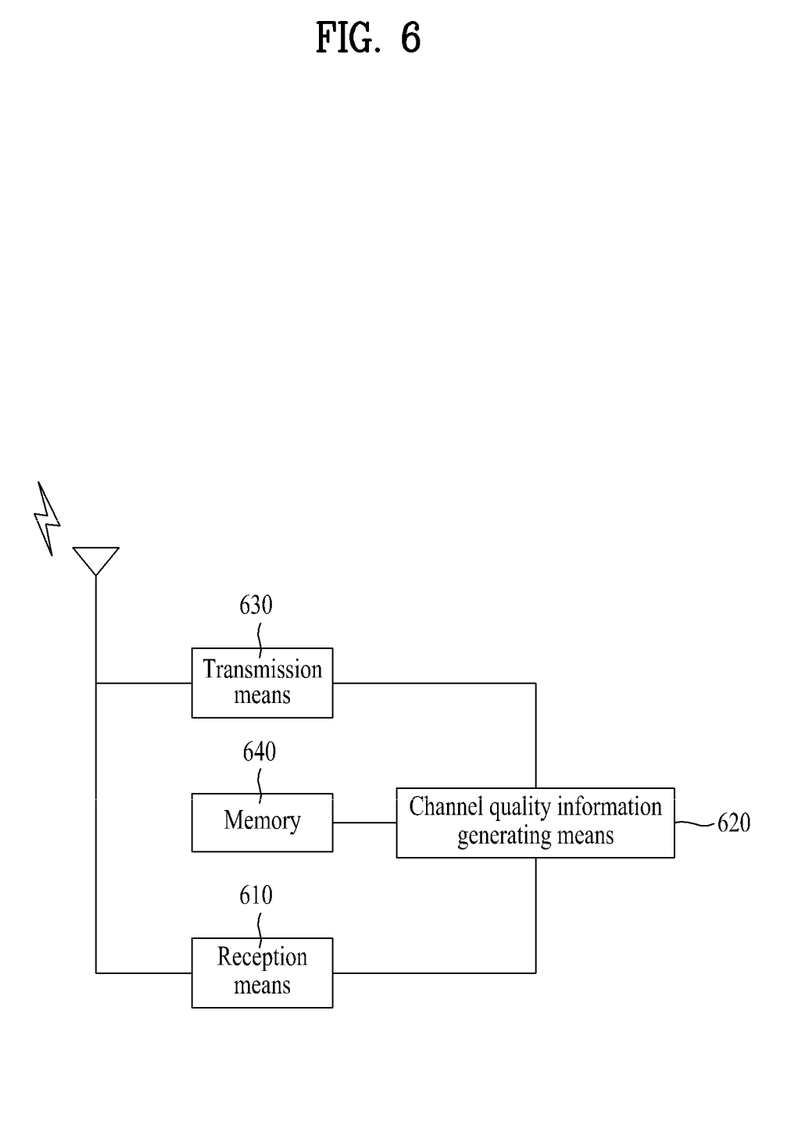
FIG. 6 is a diagram illustrating a preferred embodiment of a base station according to the present invention.

FIG. 6 is a diagram illustrating a preferred embodiment of a base station according to the present invention.

Referring to FIG. 6, the base station may include a reception means 610, a channel quality information generating means 620, a transmission means 630, and a memory 640.

The reception means 610 may receive one or more of signal strength or interference level of the cells, which perform the CoMP operation, and the sum of interference levels of cells, which do not perform the CoMP operation, from the user equipment. Alternatively, the reception means 610 may receive one or more specific values, which are generated using two or more of signal strength or interference level of each cell and the sum of noise and interference levels of the cells that do not perform the CoMP operation, from the user equipment.

The channel quality information generating means 620 may generate one or more of a channel quality information value corresponding to a first CoMP scheme and a channel quality information value corresponding to a second CoMP scheme by using the received information. At this time, data of the neighboring cells that perform the CoMP operation may be mapped into a region except for the region where the reference signal of the serving cell is mapped, and the reference signal of the serving cell and the signals of the cells, which do not perform the CoMP operation, may be identified as specific tones in the region where the reference signal of the serving cell is mapped.

The transmission means 630 may transmit various data and information including generated channel state information to the user equipment and a neighboring base station.

The memory 640 may store externally received information, operation-processed information, etc. for a predetermined time period, and may be replaced with an element such as a buffer (not shown).

Those skilled in the art will appreciate that the present invention may be carried out in other specific ways than those set forth herein without departing from the spirit and essential characteristics of the present invention. It is also obvious to those skilled in the art that claims that are not explicitly cited in each other in the appended claims may be presented in combination as an embodiment of the present invention or included as a new claim by a subsequent amendment after the application is filed.

The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The method for generating channel quality information in a CoMP operation, the method for transmitting feedback information, and the user equipment based on the methods may be applied to various wireless communication systems such as 3GPP LTE, LTE-A and IEEE 802.

The invention claimed is:

1. A method for transmitting feedback information in a CoMP (Coordinated Multi-Point) operation at a user equipment (UE), the method comprising:
   measuring at least one of a signal strength and an interference level for each of first cells performing the CoMP operation, by using a reference signal received from each of the first cells;
   measuring a sum of noise and interference levels for second cells, which do not perform the CoMP operation, by using a first region to which a reference signal of a serving cell among the first cells is transmitted; and
   transmitting to the serving cell, at least of:
      the signal strength or the interference level of each of the first cells,
      the sum of noise and the interference levels of the second cells, and
      one or more specific values generated using two or more of the signal strength, the interference level of each of the first cells and the sum of the noise and interference level of the second cells,
   wherein data of a neighboring cell among the first cells is mapped into a region except for the first region where the reference signal of the serving cell is mapped, and
   wherein the reference signal of the serving cell and signals of the second cells are identified based on specific tones in the first region.

2. The method according to claim 1, wherein a power boosting level of the data and the reference signals of the neighboring cell which performs the CoMP operation is the same as those of the reference signal and data of the serving cell.

3. The method according to claim 1, wherein the data of the neighboring cell is nulled in the first region where the reference signal of the serving cell is mapped.

4. The method according to claim 3, wherein the nulling is performed for an interval where the CoMP operation is performed or at a specific time when the user equipment estimates a channel state.

5. A user equipment (UE) for transmitting feedback information in a CoMP (Coordinated Multi-Point) operation, the user equipment comprising:
   a measurement means configured to measure:
      a signal strength or an interference level for each of first cells performing the CoMP operation, by using a reference signal received from each of the first cells; and
      a sum of noise and interference levels of second cells, which do not perform the CoMP operation, by using a first region to which a reference signal of a serving cell among the first cells is transmitted; and
   a transmission means configured to transmit to the serving cell, at least one of:
      the signal strength,
      the interference level of each of the first cells,
      the sum of the noise and the interference levels of the second cells, and
      one or more specific values generated using two or more of the signal strength, the interference level of each of the first cells and the sum of the noise and interference levels of the second cells,
   wherein data of a neighboring cell among the first cells is mapped into a region except for the first region where the reference signal of the serving cell is mapped, and wherein the reference signal of the serving cell and signals of the second cells are identified based on specific tones in the first region.

6. A method for generating channel quality information in a base station performing a CoMP (Coordinated Multi-Point) operation, the method comprising:
receiving information from a user equipment, the received information including at least one of:
a signal strength or an interference level for each of first cells performing the CoMP operation,
a sum of noise and interference levels of second cells which do not perform the CoMP operation, and
one or more specific values generated using two or more of the signal strength, the interference level of each of the first cells and the sum of the noise and interference levels of the second cells; and
generating one or more of a channel quality information value corresponding to a first CoMP operation scheme and a channel quality information value corresponding to a second CoMP operation scheme by using the received information,
wherein data of a neighboring cell among the first cells is mapped into a region except for a first region where a reference signal of a serving cell among the first cells is mapped, and the reference signal of the serving cell and signals of the second cells are identified based on specific tones in the first region.

7. The method according to claim 6, wherein the first CoMP operation scheme is a coordinated beamforming scheme, and the channel quality information value corresponding to the first CoMP operation scheme is generated using the signal strength of the serving cell and the sum of the noise and interference levels of the second cells.

8. The method according to claim 6, wherein the second CoMP operation scheme is a joint processing scheme, and the channel quality information value corresponding to the second CoMP operation scheme generated using the signal strength or the interference level of each of the first cells and the sum of the noise interference levels of the second cells.

9. The method according to claim 6, wherein the channel quality information value corresponding to the first CoMP operation scheme is expressed by the following Equation A:

$$CQI_{CB} = \frac{S_A}{\overline{N}},$$ [Equation A]

where $S_A$ is the signal strength of the serving cell, and $\overline{N}$ is the sum of the noise and interference levels of the second cells.

10. The method according to claim 6, wherein the channel quality information value corresponding to the second CoMP operation scheme is expressed by the following Equation B:

$$CQI_{JP} = \left(\frac{\sqrt{S_A} + \sqrt{S_B} + \sqrt{S_C}}{\sqrt{\overline{N}}}\right)^2,$$ [Equation B]

where $S_A$, $S_B$ and $S_C$ are signal strengths or interference levels of respective first cells A, B and C, and $\overline{N}$ is the sum of the noise and interference levels of the second cells.

11. A base station for performing a CoMP (Coordinated Multi-Point) operation, the base station comprising:
a receiving means configured to receive information from a user equipment, the received information including at least one of:
a signal strength or interference level for each of first cells performing the CoMP operation,
a sum of noise and interference levels of second cells which do not perform the CoMP operation,
one or more specific values generated using two or more of the signal strength or interference level of each of the first cells and the sum of the noise and interference levels of the second cells which do not perform the CoMP operation; and
a generating means configured to generate one or more of a channel quality information value corresponding to a first CoMP operation scheme and a channel quality information value corresponding to a second CoMP operation scheme by using the received information,
wherein data of a neighboring cell among the first cells is mapped into a region except for a first region where a reference signal of a serving cell among the first cell is mapped, and
wherein the reference signal of the serving cell and signals of the second cells are identified based on specific tones in the first region.

* * * * *